United States Patent Office 2,712,857
Patented July 12, 1955

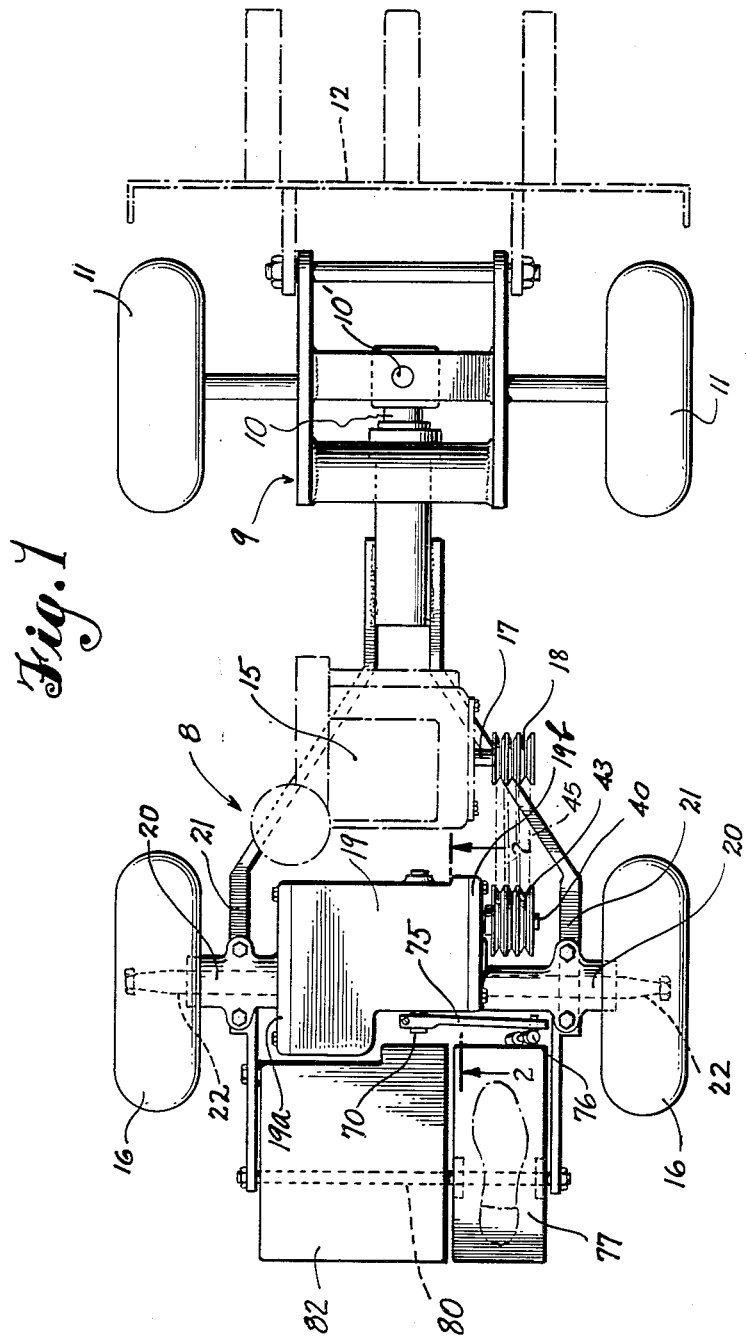

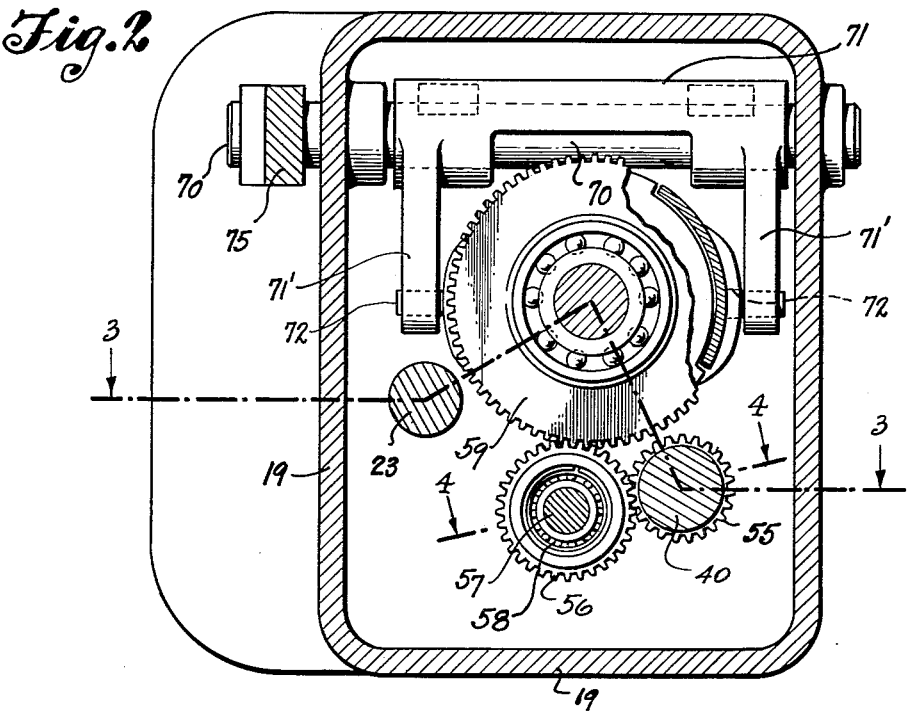
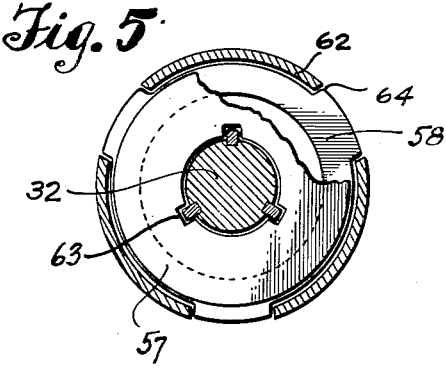
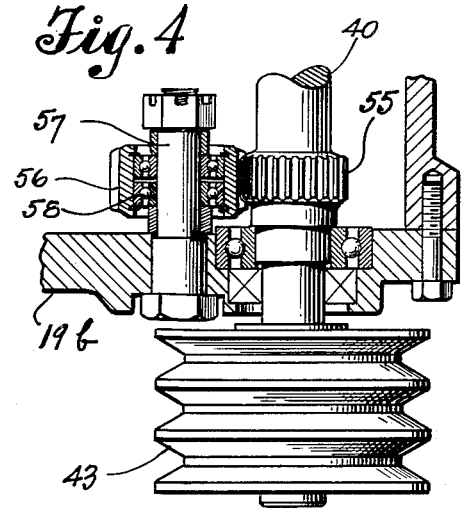
INVENTOR.
RODNEY JACKSON
BY
Cook & Robinson
ATTORNEYS

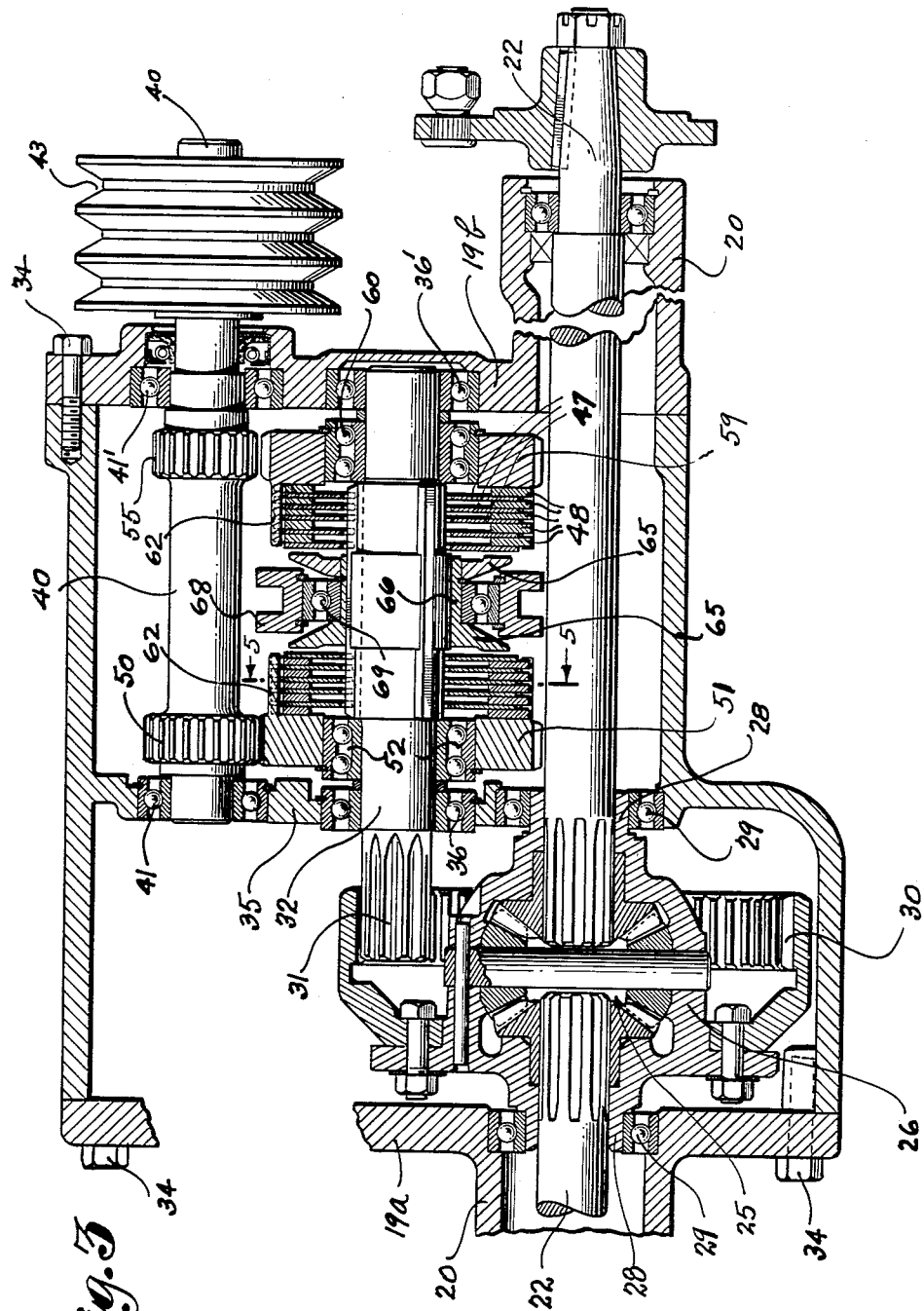

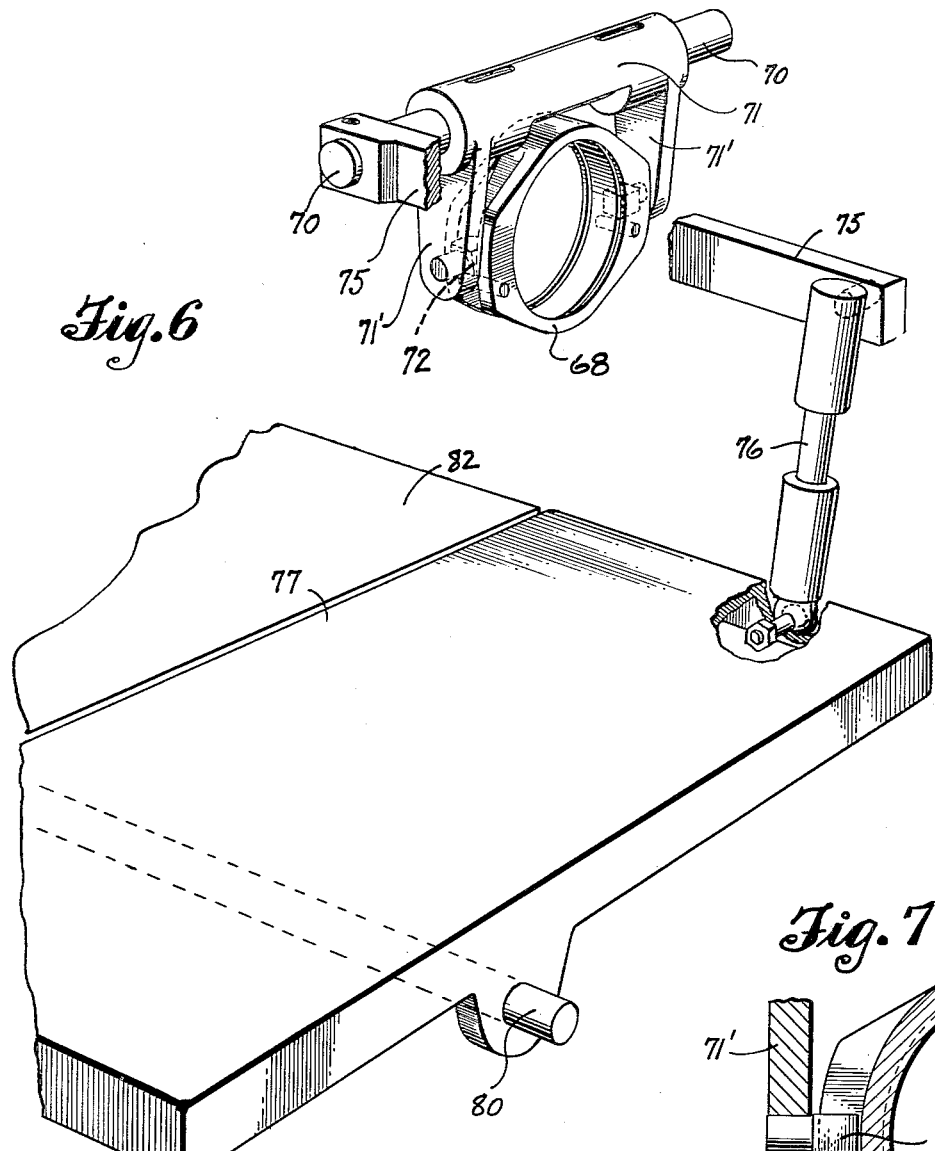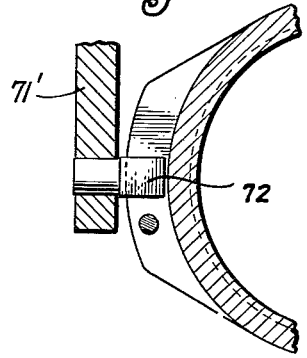

2,712,857

FORWARD AND REVERSE MEANS FOR THE DRIVING AND BRAKING OF INDUSTRIAL HAND TRUCKS

Rodney Jackson, Seattle, Wash., assignor to Paul J. Isaacson and F. T. Isaacson

Application July 30, 1951, Serial No. 239,281

1 Claim. (Cl. 180—70)

This invention relates to improvements in motorized hand trucks and it has reference more particularly to motorized hand trucks of that type typified by U. S. Patents No. 2,377,389 and 2,430,625; which patents describe and illustrate motorized hand trucks having chassis with articulated front and rear sections; with the front section steerable and equipped for the carrying of a load, and the rear section mounting an engine for the propulsion of the truck and also being designed for carrying the truck operator thereon. It is to be understood, however, that the present invention, which has to do mainly with a reversable drive and two-way braking means, as incorporated in the power transmission system, is not to be restricted or confined to this particular kind of truck but may be applicable to or adaptable to various makes and kinds of vehicles where quick starting and stopping, braking and driving in forward and rearward directions is required.

Hand trucks of the types of those described in the above mentioned U. S. patents, and also that described and illustrated in my co-pending application executed on July 17, 1951, and filed on July 27, 1951, under Ser. No. 238,893, now Patent No. 2,682,349, provide practical means for the quick transportation of boxes, barrels, sacked goods and various other articles required to be move about in freight yards, in factories, warehouses, stores, or on docks or in ships, and it is extremely advantageous that such hand-trucks be equipped with power transmission mechanism and controls therefor that provide for quick starting, stopping and reversing in direction of travel. Also, that adequate two-way braking facilities be provided to permit the quick stops, and that the means for manual control of the various parts be simple in construction, easily accessible and conveniently operable.

In view of the above, it has been the principal object of this invention to provide, as a part of the power transmission mechanism for the truck, a combined driving and braking clutch mechanism and single control therefor, that is especially applicable for use with the power transmission system of hand-trucks of the above stated character, and through which mechanism, the truck can be selectively driven either in forward or reverse direction, and can be braked equally well in either direction of travel. Furthermore, to provide a mechanism wherein all of the various operations, including that of selectively driving in either direction, stopping, reversing, braking in either direction, and idling in neutral is accomplished through use of a single control element which, in the present instance, is foot operated and is located in a position convenient to the operator while riding on and steering the vehicle.

More specifically stated, the present invention resides in the adaptation of a pair of friction disk clutch assemblies on a shaft common to both, for use as a part of the power transmission mechanism of a truck of the character illustrated and described, for selectively driving in either direction, for braking in either direction and for operation of the engine at a neutral setting of the clutch mechanism.

Further objects of the invention reside in the details of construction and relationship of parts, and in their mode of use as comprised in the power transmission mechanism of the truck, and in the simplified means of control, as will hereinafter be fully described.

In accomplishing these and other objects of the invention, I have provided the improved details of construction, the preferred forms of which are illustrated in the accompanying drawings, wherein—

Fig. 1 is a top, or plan view of a hand-truck in which clutch mechanism for combined driving and braking purposes is embodied in accordance with the objects of the present invention, and showing also the clutch control pedal.

Fig. 2 is an enlarged, cross-sectional view, taken through the clutch housing on the line 2—2 in Fig. 1, and showing the clutch control yoke and parts of the clutch gearing.

Fig. 3 is a horizontally flattened section taken through the clutch and power transmission system on the irregular line 3—3 of Fig. 2.

Fig. 4 is a sectional detail, taken on the line 4—4 in Fig. 2, particularly illustrating the idler wheel and its mounting means as applied to an end wall of the clutch enclosing housing.

Fig. 5 is a cross-sectional detail of the clutch mechanism taken substantially on line 5—5 in Fig. 3.

Fig. 6 is a perspective view showing the foot pedal control for the clutch mechanism and the operating connection between pedal and the clutch shifting collar.

Fig. 7 is a sectional detail of the connection between clutch shifting collar and one of the yoke arms.

The present invention is not based upon the present clutch mechanism per se, but only in the use or adaptation of such a clutch mechanism as a part of a power transmission and braking system for vehicles of the kind described which are characterized, in their functional use, by fast travel, quick starts, stops, and reverse driving which incidentally makes it necessary to provide adequate and easily operable two-way braking facilities. While the present invention has been illustrated in its application to a truck like that of my co-pending application previously mentioned, it is to be understood that it is likewise applicable to various other makes and types of trucks which are of similar character or used in a like manner.

The industrial hand truck illustrated in plan view in Fig. 1 comprises a chassis having a wheel supported rear section, designated in its entirety by reference numeral 8, and a wheel supported front end section designated in its entirety by numeral 9. The sections 8 and 9 are joined through the mediacy of a horizontally and longitudinally extending swivel spindle shaft 10 that is equipped at its front end with a pivot pin 10' which is applied in the vertical axial plane of the front wheels 11—11, and it is contemplated, although not illustrated in this disclosure, that the front section 9 be equipped with means for hand steering by the operator while standing on the rear section. Also, that means for support of a load be mounted on the front section; such means being herein indicated in part in dotted lines at 12 in Fig. 1.

The present truck is propelled, or driven, by an engine which is designated in Fig. 1 by reference numeral 15, and which engine is shown to be mounted on the forward portion of the rear end section of the chassis; this section of the chassis being supported by wheels 16—16, at opposite sides and arranged in tracking alignment with the front wheels and co-acting therewith for the support of the truck.

The engine 15 is equipped with a laterally extended drive shaft 17 provided at its end with belt pulleys 18 for V-belt drive. Propelling force is transmitted from the engine to the truck driving wheels 16—16 through the mediacy of the transmission mechanism which characterizes this invention and which is enclosed within a housing 19 that is disposed rearwardly of the engine and also rigidly fixed to the chassis section 8. Extended from the opposite side walls of the clutch housing 19 are axle housings 20—20, and these are securely bolted to opposite side members 21—21 of the chassis as seen in Fig. 1.

The truck supporting and driving wheels 16—16 are located at the outer ends of the axle housings 20—20 and are keyed to the outer ends of axially aligned differential shafts, or axles, 22—22 which are shown in Fig. 3 to be inter-connected at their inner ends through a differential gearing of common form, designated in its entirety by numeral 25; this differential gearing being mounted by and enclosed within a housing or frame 26, which is contained within the housing 19 as has been illustrated in Fig. 3.

Extending from the opposite side walls of the frame or housing 26 are trunnion supports 28—28; these being rotatably contained in anti-friction bearings 29—29 that are set within openings provided therefor in walls of housing 19 as seen in Fig. 3.

Fixed to and encircling the housing or frame 26, coaxially of its tubular trunnions and the differential axles 22—22 which extend outwardly through the trunnions and axle housings 20—20, is a master gear wheel 30 of internal ring-gear type. Operatively meshing with the master gear wheel 30 is a driving gear pinion 31, formed at one end of a clutch shaft 32 which is shown in Fig. 3 as being mounted parallel with and at one side of the line of the differential axles 22—22.

The present driving, reversing and braking mechanism is enclosed within the housing 19 which is of the box-like form shown in Figs. 1 and 2. The opposite ends of the housing 19 are closed by detachable end plates 19a and 19b, seen best in Fig. 3, secured to the housing by bolts 34. It is observed also in Fig. 3 that the tubular axle housings 22—22 are integral with and extend from these end plates. Also, it is noted in this view that the housing 19 is formed with a vertical partition wall 35 and that the opposite end portions of the clutch shaft 32 are rotatably mounted in anti-friction bearings 36—36' set in openings provided for them in this wall and in the end plate 19b respectively.

Mounted in the housing 19, parallel with the clutch shaft 32, is a one-way driven shaft 40. This is revolubly supported at one end in the housing wall 35, and at its other end in wall plate 19b by anti-friction bearings 41—41'. One end portion of the shaft 40 extends through and beyond the plate 19b and is there equipped with V-belt pulleys 43 aligned with the pulleys 18 on the engine driven shaft 17. V-belts 45, as designated in dotted lines in Fig. 1 operate about the aligned pulleys 18 and 43 to complete the driving connection between engine shaft 17 and shaft 40.

Formed on the driven shaft 40, closely adjacent the partition wall 35 of housing 19, is a gear pinion 50 in driving mesh with a gear wheel 51 that is mounted to rotate coaxially of and about the clutch shaft 32; the gear wheel 51 being mounted by anti-friction bearings 52 fitted to shaft 32. Also, formed on the cross-shaft 40, just within the end plate 19b, is a pinion gear wheel 55. This is of slightly lesser diameter than gear pinion 50 and it operates in mesh with an idler gear 56, as seen in Figs. 2 and 4, mounted on a stud bolt 57 that is fixed in the end plate 19b as has been shown in Fig. 4. The idler gear is mounted on ball bearings, as at 58 and it meshes with a gear wheel 59 that is revolubly mounted on the clutch shaft 32 through the mediacy of anti-friction bearings 60. It will now be understood that when the cross-shaft 40 is being driven through the belt connection with the engine, the gear wheels 51 and 59, mounted on the clutch shaft 32, will be driven in opposite direction by pinion 55 through the idler gear wheel 56, which causes the reversal in its direction and reverse driving of the truck.

Associated with the oppositely driven gear wheels 51 and 59 are clutch mechanisms of the friction disk type; each, as seen in Fig. 5, comprising an assembly of friction disks 47 and 48 that are alternatively assembled on the shaft 32 and are slidably keyed to the shaft and to the cylindrical enclosing flanges 62 that are integrally formed on the gears 51 and 59 and extend from their inner faces coaxially of the shaft 32. The keyed connections of the alternating disks with the shaft 32 and flanges 62 are indicated at 63 and 64 in Fig. 5.

A pair of oppositely facing clutch engaging and releasing disks 65—65, are mounted on the clutch shaft 32 between the clutch disk packs as has been shown in Fig. 3. These disks 65—65 are joined by a hub portion 66 slidably keyed on the clutch shaft, and a shifting collar 68 is mounted on anti-friction bearings 69. The disks 65—65 are adapted to be shifted from a neutral setting, as seen in Fig. 3 with both clutches disengaged, selectively in opposite directions thus to selectively engage the disk packs, either to effect a forward driving connection between the clutch shaft 32 and gear wheel 51, or to effect a reverse driving connection, through gear wheel 59. It is understood that the setting of either clutch completes a driving connection between shafts 40 and 32.

The shifting of the clutch collar 68 is manually effected by the operator through means best shown in Figs. 1, 2 and 6, comprising a cross-shaft 70 that extends horizontally through the top portion of housing 19, and on which a yoke 71 is fixed. The yoke has spaced depending legs 71'—71' extended downwardly to opposite sides of collar 68 and provided with shifting connections as at 72. Fixed to the outer end of the cross-shaft 70 is a lever arm 75. This arm extends in a direction transversely of the chassis, as noted in Fig. 1, and at its end is operatively connected by means of a link 76 with the forward end of a foot pedal 77. The pedal, as seen in Fig. 1, is mounted pivotally between its ends on a supporting cross-shaft 80 that is rigidly mounted in the chassis of the truck. This pedal is located adjacent the side of a platform 82 for the operator.

In using the truck, the operator stands on the platform 82 with his right foot resting on the foot pedal in the position indicated in dotted lines in Fig. 1. By tilting the pedal on its supporting shaft 80, from a level position, downwardly or upwardly, the yoke 71 will be oscillated in one direction or the other accordingly, thus to cause the clutch disks 65—65 to be shifted from a neutral setting to selectively engage the clutches for forward or reverse driving. Through the mediacy of the pedal 77, the clutch disks may be held at a neutral position. When shifted to one side or the other to engage one clutch, the other will remain disengaged. If the truck is moving forwardly, and it is desired to stop, the driving clutch is disengaged and the reverse clutch can be used for braking purposes. Likewise, if the truck is moving rearwardly, the forward driving clutch can be used for braking purposes. The advantages of this particular power transmission means is as follows:

Without stopping the engine, the operator can, at any time, by a simple foot movement of pedal 77 release both clutches so that neither forward or reverse driving is effected. From this neutral position he can engage either clutch, to selectively effect a forward or a reverse driving connection merely by a slight forward or rearward tilting of the foot pedal. When traveling in either direction under power of the engine, a quick stop can be made by an opposite tilting of the foot pedal. This not only disengages the driving clutch but causes a braking effect to be effected by the other clutch, and this braking action can be applied to more or less extent to quickly stop or to merely retard movement.

The present clutch mechanism, as applied to a truck of this type permits high speed operations, and quick stops and starts without jerk or jar that is detrimental to the mechanism, and the clutch setting and releasing operations are easy to accomplish through a single control element.

Having thus described my invention, what I claim as new therein and desire to secure by Letters Patent, is:

A truck of the class described having a chassis, and driving and supporting wheels, axially aligned driving axles for the driving wheels, a differential gearing interconnecting said axles, an engine for the propulsion of the vehicle, and a reversible power transmission and two-way braking means providing an operative connection between the engine and the differential gearing, and comprising a one-way engine driven shaft with two pinion gears fixed thereon, a clutch shaft operatively connected at one end portion thereof with said differential gearing, the engine shaft and clutch shaft being disposed parallel with the driving axles, the clutch shaft extending alongside one of said axles, a gear wheel revoluble about the clutch shaft and directly driven by one of said pinion gears, another gear wheel revoluble about the clutch shaft and spaced from the gear wheel on said shaft, said gear wheels being fixed on the shaft against movement longitudinally thereof, an idler gear providing a driving connection between the last mentioned gear wheel and the other pinion gear, two disk clutch assemblies mounted on the clutch shaft between the gear wheels and providing releasable driving and braking connections between the clutch shaft and said gear wheels, a clutch actuating member slidable longitudinally and keyed on the clutch shaft between the clutch assemblies and including oppositely facing clutch setting disks at its opposite ends, and a single control pedal mounted on the chassis for vertical rocking movement and operatively connected with said clutch actuating member whereby by rocking movement of the control pedal said clutch actuating member can be shifted longitudinally in opposite directions from a neutral setting of the same between and out of engagement with the clutch assemblies to selectively engage and energize the clutch assemblies for forward or reverse driving of the vehicle therethrough and to selectively engage the clutch assemblies with a variable braking pressure for retarding movement of the truck in either a forward or backward direction, and constitutes the sole means for braking the truck.

References Cited in the file of this patent

UNITED STATES PATENTS

| | | |
|---|---|---|
| 1,459,026 | Kocher | June 19, 1923 |
| 1,519,164 | Pfeiffer | Dec. 16, 1924 |
| 2,207,447 | Viles | July 9, 1940 |
| 2,264,512 | Dunham | Dec. 2, 1941 |
| 2,361,190 | Gerst | Oct. 24, 1944 |
| 2,405,642 | Corte | Aug. 13, 1946 |
| 2,547,732 | Baker | Apr. 3, 1951 |

FOREIGN PATENTS

| | | |
|---|---|---|
| 547,857 | France | Oct. 4, 1922 |